US 8,843,568 B2

(12) United States Patent
Vitaldevara et al.

(10) Patent No.: US 8,843,568 B2
(45) Date of Patent: Sep. 23, 2014

(54) EMAIL TAGS

(75) Inventors: Krishna Vitaldevara, Fremont, CA (US); Sanchan Sahai Saxena, San Francisco, CA (US); Eliot C. Gillum, Mountain View, CA (US); Rebecca Ping Zhu, Mountain View, CA (US); Tyler J. Schnoebelen, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 12/781,764

(22) Filed: May 17, 2010

(65) Prior Publication Data

US 2011/0282948 A1     Nov. 17, 2011

(51) Int. Cl.
G06F 15/16     (2006.01)
G06Q 10/10     (2012.01)
H04L 12/58     (2006.01)

(52) U.S. Cl.
CPC .......... *H04L 12/5855* (2013.01); *G06Q 10/107* (2013.01); *H04L 12/58* (2013.01); *G06Q 10/10* (2013.01); *H04L 51/14* (2013.01)
USPC ............ 709/206; 709/207; 715/230; 715/752

(58) Field of Classification Search
USPC .................. 709/206, 207; 715/200, 230, 752
See application file for complete search history.

(56) References Cited

U.S. PATENT DOCUMENTS

| | | | |
|---|---|---|---|
| 6,052,709 A * | 4/2000 | Paul ............................. | 709/202 |
| 6,092,101 A * | 7/2000 | Birrell et al. .................. | 709/206 |
| 6,161,130 A * | 12/2000 | Horvitz et al. ................ | 709/206 |
| 7,346,660 B2 | 3/2008 | Kulkarni | |
| 7,418,461 B2 * | 8/2008 | Tamma et al. ......................... | 1/1 |
| 7,428,579 B2 * | 9/2008 | Libbey et al. ................. | 709/206 |
| 7,546,348 B2 * | 6/2009 | Wilson et al. ................. | 709/206 |
| 7,562,357 B2 * | 7/2009 | Tamma et al. ................ | 717/170 |
| 7,565,404 B2 * | 7/2009 | Gwozdz ........................ | 709/206 |
| 7,610,341 B2 * | 10/2009 | Daniell ......................... | 709/206 |
| 7,657,640 B2 | 2/2010 | Decime | |
| 7,672,436 B1 | 3/2010 | Thenthiruperai et al. | |
| 7,693,942 B2 * | 4/2010 | Nale ............................. | 709/206 |
| 7,693,943 B2 * | 4/2010 | Rajan et al. ................... | 709/206 |
| 7,730,141 B2 * | 6/2010 | Costea et al. ................. | 709/206 |
| 7,925,707 B2 * | 4/2011 | Wilson et al. ................. | 709/206 |
| 7,996,900 B2 * | 8/2011 | Gillum et al. ................... | 726/23 |
| 8,073,910 B2 * | 12/2011 | Tokuda et al. ................ | 709/206 |

(Continued)

OTHER PUBLICATIONS

"How to organize Windows Mail Inbox!", Retrieved from: <http://www.zolved.com/synapse/view_content/28099/How_to_organize_Windows_Mail_Inbox> on Apr. 30, 2010, (2007), 3 pages.

(Continued)

*Primary Examiner* — Jimmy H Tran
(74) *Attorney, Agent, or Firm* — Tom Wong; Jim Ross; Micky Minhas

(57) ABSTRACT

Email tags are described. In embodiments, email messages are received for distribution to client devices that correspond to respective recipients of the email messages. Email routing decisions are applied to route an email message to an email folder for a recipient of the email message, where the email folder may include an email inbox, a junk folder, or a user-created folder. The email message is then tagged with an email tag to generate a tagged email message. The email tag includes a routing description that indicates why the email message was routed to the particular email folder.

19 Claims, 8 Drawing Sheets

(56) References Cited

U.S. PATENT DOCUMENTS

| | | | |
|---|---|---|---|
| 8,195,753 B2* | 6/2012 | Vitaldevara et al. | 709/206 |
| 8,255,468 B2* | 8/2012 | Vitaldevara et al. | 709/206 |
| 8,316,090 B2* | 11/2012 | Addante | 709/206 |
| 8,327,445 B2* | 12/2012 | Gillum et al. | 726/23 |
| 8,370,902 B2* | 2/2013 | Davis et al. | 726/3 |
| 8,434,150 B2* | 4/2013 | Xie et al. | 726/22 |
| 8,490,185 B2* | 7/2013 | Gillum et al. | 726/22 |
| 8,626,856 B2* | 1/2014 | Vitaldevara et al. | 709/206 |
| 8,682,990 B2* | 3/2014 | Vitaldevara et al. | 709/206 |
| 2003/0074411 A1* | 4/2003 | Nale | 709/206 |
| 2003/0182383 A1* | 9/2003 | He | 709/206 |
| 2004/0267886 A1 | 12/2004 | Malik | |
| 2005/0097174 A1* | 5/2005 | Daniell | 709/206 |
| 2005/0204006 A1* | 9/2005 | Purcell et al. | 709/206 |
| 2006/0031313 A1* | 2/2006 | Libbey et al. | 709/206 |
| 2006/0031347 A1 | 2/2006 | Sahi | |
| 2006/0168045 A1* | 7/2006 | Pickover | 709/206 |
| 2006/0282503 A1* | 12/2006 | Gwozdz | 709/206 |
| 2007/0005702 A1* | 1/2007 | Tokuda et al. | 709/206 |
| 2007/0043815 A1 | 2/2007 | Tsang et al. | |
| 2007/0143411 A1* | 6/2007 | Costea et al. | 709/206 |
| 2007/0174398 A1* | 7/2007 | Addante | 709/206 |
| 2008/0010353 A1* | 1/2008 | Rounthwaite et al. | 709/206 |
| 2008/0126353 A1 | 5/2008 | Baude et al. | |
| 2009/0043850 A1* | 2/2009 | Weir et al. | 709/206 |
| 2009/0106370 A1* | 4/2009 | Dreyfus et al. | 709/206 |
| 2009/0125528 A1 | 5/2009 | Choi | |
| 2010/0036786 A1 | 2/2010 | Pujara | |
| 2010/0070372 A1 | 3/2010 | Watfa et al. | |
| 2010/0228812 A1* | 9/2010 | Uomini | 709/203 |
| 2013/0080554 A1* | 3/2013 | Addante | 709/206 |

OTHER PUBLICATIONS

"Tags: Email Message Tagging at LuxSci", Retrieved from: <http://luxsci.com/extranet/info/tags.html> on Apr. 30, 2010, (May 26, 2008),2 pages.

International Search Report, Mailed Date: Jan. 17, 2012, Application No. PCT/US2011/036412, Filed Date: May 13, 2011, pp. 9.

* cited by examiner

| Routing Logic | Code | Routing Description |
|---|---|---|
| 404 | 402 | Email Tags 400　　　406 |

| Routing Logic | Code | Routing Description |
|---|---|---|
| — — — — — — — | Email Inbox / User-Created Folder | — — — — — — — |
| Address Book | 1 | This sender is in your contact list |
| Safe List | 2 | This sender is in your safe list |
| Safe Domain List | 3 | This sender's domain is in your safe domain list |
| Safe Mailing List | 4 | This sender is in your safe mailing list |
| Custom Rules | 5 | You have a rule set up for messages like this one |
| User Moved Message | 14 | You moved this message to the current location |
| Client Issue | 15 | This message may have been moved by another program (check the program's anti-spam settings) |
| Implicit Safe List | 6 | This message was classified as safe – always mark this sender as safe |
| Spam Filter Pass | 7 | This message may be safe – mark the sender as safe if you trust this sender |
| — — — — — — — | Junk Folder | — — — — — — — |
| Custom Rules | 5 | You have a rule set up for messages like this one |
| Exclusive Settings | 8 | Your junk email filter is set to exclusive |
| Implicit Junk List | 9 | This message was classified as junk |
| Spam Filter Catch | 10 | |
| Signature Hit | 11 | |
| TTMSBL | 12 | |
| Junked Message from Failed Auth. Domain | 13 | |
| User Moved Message | 14 | You moved this message to the current location |
| Client Issue | 15 | This message may have been moved by another program (check the program's anti-spam settings) |

Fig. 4

EMAIL TAGS

BACKGROUND

A network-based email system typically has a multitude of features and configurable user options to have incoming email messages delivered to an email inbox and/or user-defined folders. For example, a user can create rules to organize incoming email messages into different email folders. Similarly, a user can add someone to a safe sender list to continue receiving email messages from that sender in an email inbox. Additionally, some email messages are routed based on content or other characteristics, such as a spam message that is detected by the email system and routed to a junk email folder.

Email routing and organization may become problematic for a user when customized, user-defined rules and other email filters overlap and/or when a user does not remember the customized rules over a period of time. For example, a user may designate a particular sender in a safe sender list, but later create a custom rule that routes all email messages from the particular sender to the junk email folder. Similarly, the user may turn on exclusive filter settings that cause legitimate email messages to be routed to the junk email folder. A user may become frustrated when these and other email routing decisions cause email messages to be delivered to folders that are not expected.

SUMMARY

This summary is provided to introduce simplified concepts of email tags that are further described below in the Detailed Description. This summary is not intended to identify essential features of the claimed subject matter, nor is it intended for use in determining the scope of the claimed subject matter.

Email tags are described. In embodiments, email messages are received at an email distribution service for distribution to client devices that correspond to respective recipients of the email messages. Email routing decisions are applied to route an email message to an email folder for a recipient of the email message, where the email folder may include an email inbox, a junk folder, or a user-created folder. The email message is then tagged with an email tag to generate a tagged email message. The email tag includes a routing description that indicates why the email message was routed to the particular email folder. When a request for the email message is received from a client device that corresponds to the recipient of the email message, the tagged email message is communicated to the client device for display along with the routing description.

In other embodiments, a client device receives the tagged email message from the email distribution service, and displays the tagged email message along with a selectable information control that correlates to an email tag. The client device may then receive an input to initiate the selectable information control and display the routing description that indicates why the tagged email message was routed to a particular email folder. Additional email routing decisions may also be applied at the client device to sort the email message into a different email folder after receiving the tagged email message from the email distribution service. The email tag can be updated to include an updated routing description that indicates why the tagged email message was routed to the different email folder.

BRIEF DESCRIPTION OF THE DRAWINGS

Embodiments of email tags are described with reference to the following drawings. The same numbers are used throughout the drawings to reference like features and components:

FIG. 4 illustrates examples of email tags in accordance with one or more embodiments.

DETAILED DESCRIPTION

Email tags are described. In embodiments, email messages are received at an email distribution service and email routing decisions are applied to route the email messages to various email folders for a recipient of the email messages. The email messages may be routed to various email folders that include an email inbox, a junk folder, or user-created, custom folders. The email messages are tagged with information (e.g., metadata) that can be displayed at an email client device as a routing description to help a user understand why an email message has been routed to a particular email folder. A routing description provides a recipient of an email message with information to make a decision whether to change the factors on which email routing decisions are based. The recipient of an email message may want to change the factors for email routing decisions so that the actual destination of an email message correlates to the email recipient's expected destination.

While features and concepts of the described systems and methods for email tags can be implemented in any number of different environments, systems, and/or various configurations, embodiments of email tags are described in the context of the following example systems and environments.

Figure 1:
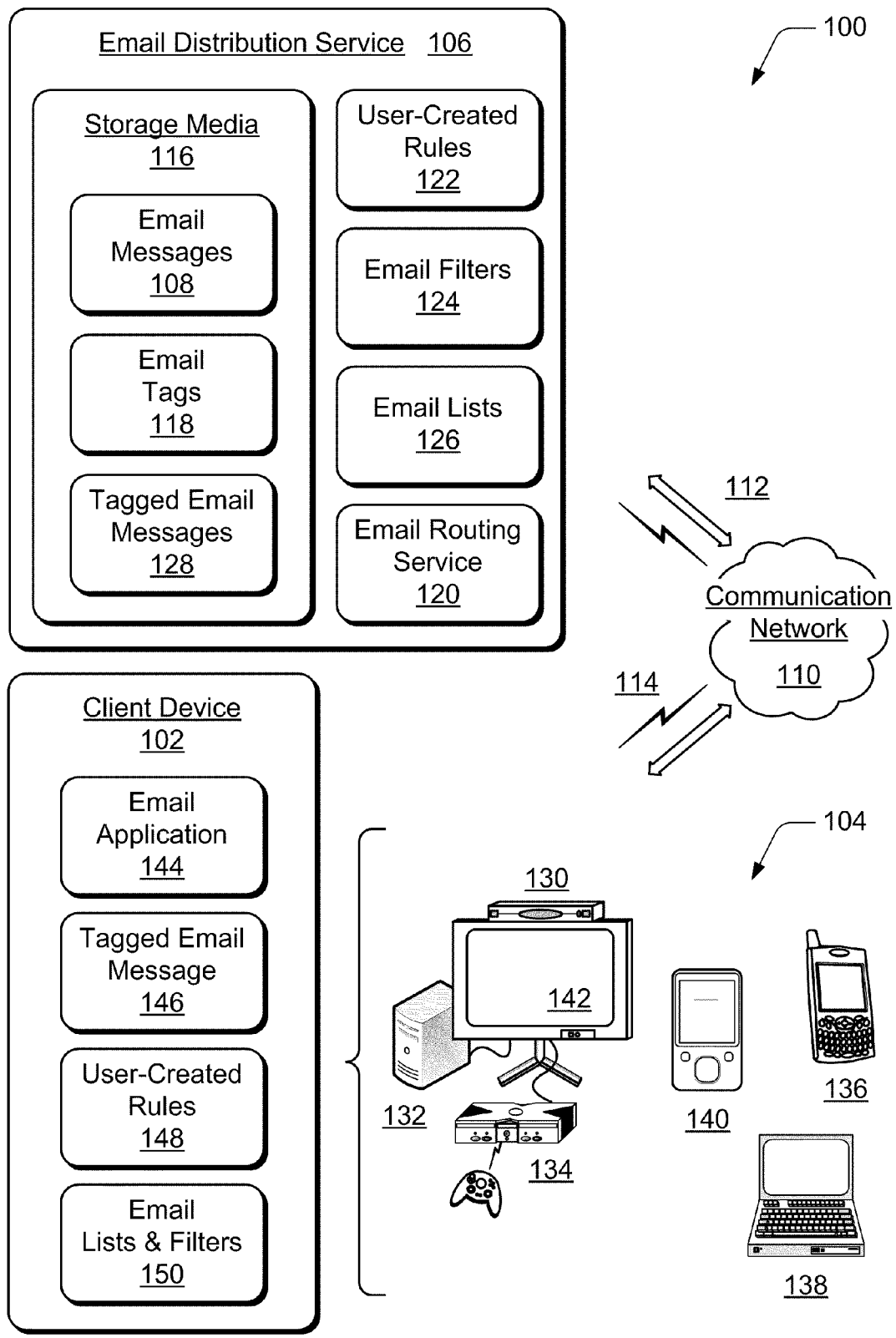
FIG. 1 illustrates an example system in which embodiments of email tags can be implemented.

FIG. 1 illustrates an example system 100 in which various embodiments of email tags can be implemented. The example system 100 includes a client device 102, which may be configured as any type of client device 104. Some of the various client devices 104 include wired and/or wireless devices, and may also be referred to as user devices and/or portable devices. The example system 100 also includes an email distribution service 106 that receives email messages 108 for distribution to the various client devices that correspond to respective recipients of the email messages. The email distribution service 106 can communicate an email message 108 to a client device 104 via a communication network 110.

The communication network 110 can be implemented to include a broadcast network, an IP-based network 112, and/or a wireless network 114 that facilitates email message distribution and data communication between the email distribution service 106 and any number of the various client devices. The communication network 110 can also be implemented using any type of network topology and/or communication protocol, and can be represented or otherwise implemented as a combination of two or more networks. The communication network 110 may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

The email distribution service 106 can include server devices to communicate, or otherwise distribute, email messages and/or other data to any number of the various client devices. In this example system 100, the email distribution service 106 includes storage media 116 to store or otherwise maintain various data, such as email messages 108 and email tags 118. The storage media 116 can be implemented as any type of memory and/or suitable electronic data storage. Additionally, the email distribution service 106 may be implemented as a subscription-based service from which any of the various client devices 104 can request email messages. The email distribution service 106 manages the email message distribution to the various client devices 104, such as when a request for an email message is received from a client device, and the email distribution service communicates or provides data segments of the email message to the client device.

In this example system 100, the email distribution service 106 includes an email routing service 120 that can be implemented as computer-executable instructions and executed by one or more processors to implement the various embodiments described herein for email tags. The email distribution service 106 can also be implemented with any number and combination of differing components as further described with reference to the example device shown in FIG. 8. Additionally, the email routing service 120 may be implemented as an independent service separate from the email distribution service (e.g., on a separate server or by a third party service).

In various embodiments, the email routing service 120 is implemented to apply email routing decisions to route an email message 108 to an email folder for a recipient of the email message, such as a user that is associated with the client device 102. The email routing decisions may include any one or combination of user-created rules 122, email filters 124, and email lists 126 (e.g., safe sender list, contact list, safe domain list, safe mailing list, and the like). An email folder for a recipient may include any one of an email inbox, junk folder, user-created folder (e.g., a custom folder), and the like. The email routing service 120 is also implemented to then tag an email message 108 that has been routed to a particular email folder with an email tag 118 to generate a tagged email message 128.

Examples of various email tags are described with reference to FIG. 4. In an embodiment, an email tag 118 includes a routing description that indicates why an email message was routed to a particular email folder for a recipient of the email message. The email distribution service 106 can receive a request for an email message 108 from a client device that corresponds to the recipient of the email message, and then communicate the corresponding tagged email message 128 to the client device for display along with the routing description. A recipient of an email message can then determine, from the routing description, why an email message has been routed to a particular email folder. For example, an email message that a user expects to receive in an email inbox may be detected as a spam message and routed to a junk email folder. From the routing description, the recipient will know why the email message was routed to the junk email folder, and can then modify or adjust email filters, email lists, and/or user-defined rules so that subsequent email messages from the particular sender are routed to the email inbox as expected.

In this example system 100, a client device 104 can be implemented as any one or combination of a television client device 130, a computer device 132, a gaming system 134, an appliance device, an electronic device, and/or as any other type of client device or user device that may be implemented to receive content (e.g., email messages) in any form of audio, video, and/or image data. The various client devices 104 can also include wireless devices implemented to receive and/or communicate wireless data, such as any one or combination of a mobile phone 136 (e.g., cellular, VoIP, WiFi, etc.), a portable computer device 138, a media device 140 (e.g., a personal media player, portable media player, etc.), and/or any other wireless device that can receive media content (e.g., email messages) in any form of audio, video, and/or image data. A client system can include a respective client device and display device 142 that together render email messages for display. The display device 142 can be implemented as any type of a television, high definition television (HDTV), LCD, or similar display system.

Any of the various client devices 104 can be configured as the client device 102 and implemented with one or more processors, communication components, memory components, signal processing and control circuits, a rendering system, and/or an integrated display. Further, any of the client devices 104 can be implemented with any number and combination of differing components as further described with reference to the example device shown in FIG. 8.

The example client device 102 includes an email application 144 that is implemented to request, receive, and process email messages for a user at the client device. The client device 102 can receive a tagged email message 146 from the email distribution service 106, such as when a user at the client device initiates the email application 144. Optionally, the email application 144 may also apply additional email routing decisions to sort the tagged email message into a different email folder after the tagged email message is received from the email distribution service. The additional email routing decisions at the client device 102 may include user-created rules 148 and/or email lists and filters 150. The email application 144 can then update the email tag to include an updated routing description that indicates why the tagged email message was routed to the different email folder. The client device 102 can display the tagged email message (e.g., on display device 142 or on an integrated display) along with a selectable information control that correlates to the email tag of the email message.

Figure 2:
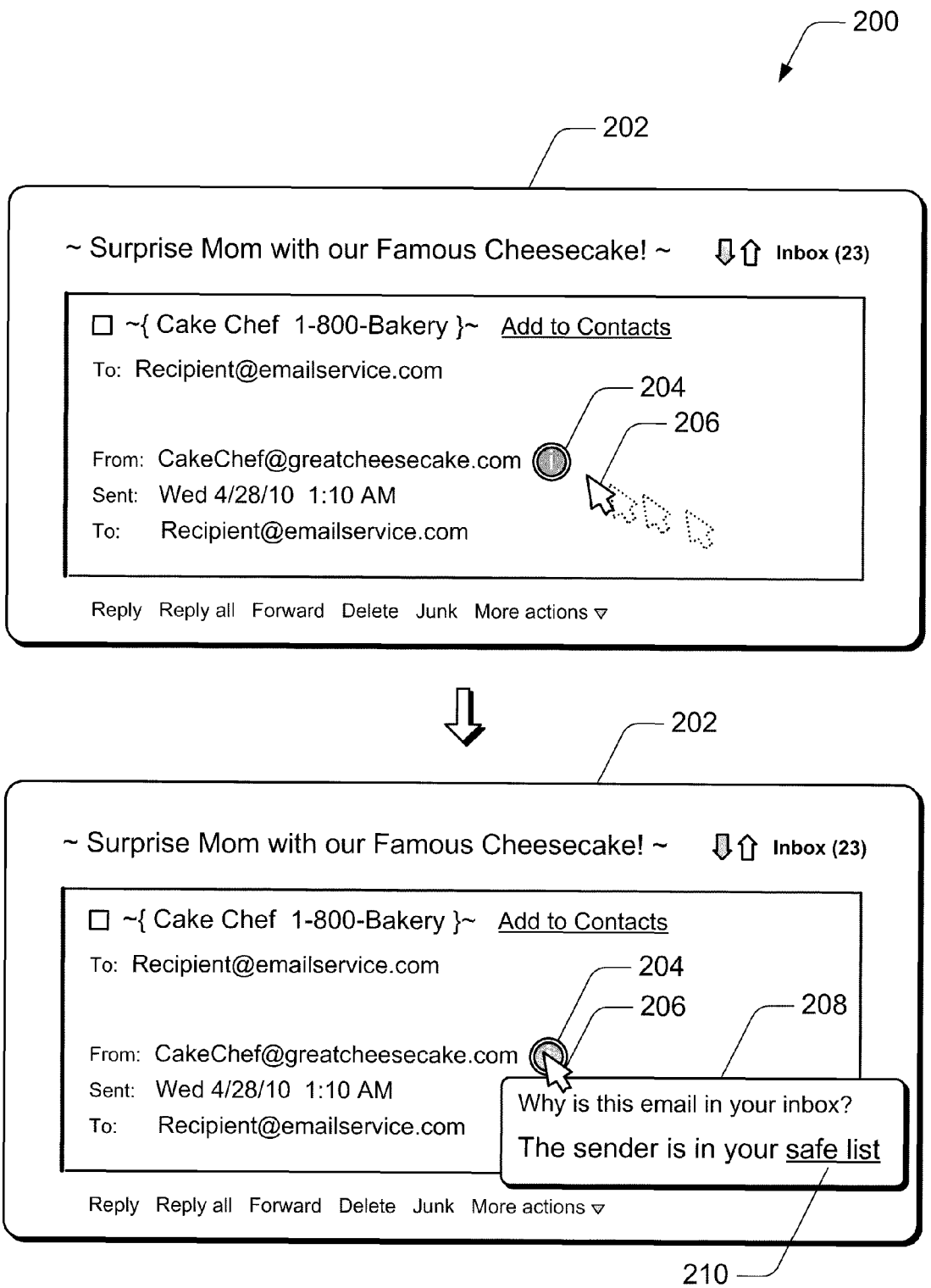
FIG. 2 illustrates an example of a tagged email message in accordance with one or more embodiments.

FIG. 2 illustrates an example 200 of a tagged email message 202 in accordance with the various embodiments described herein. The tagged email message 202 is an example of the tagged email message 146 received at client device 102 as described with reference to FIG. 1. In this example 200, the tagged email message 202 includes a selectable information control 204 that correlates to the email tag of the email message. A user can provide an input to initiate the selectable information control 204 and display the email tag, such as by moving a displayed pointer 206 that correlates to an input device (e.g., a computer mouse, or similar pointing and/or selecting input device).

The pointer 206 can be positioned to hover over the selectable information control 204. For example, client device 102 can detect the displayed pointer 206 that correlates to an input device when the pointer is displayed proximate the selectable information control 204, which initiates a display of the routing description 208. In this example, the routing description 208 indicates why the tagged email message 202 was routed to a particular email folder, such as the email inbox. In this instance, the tagged email message 202 is from a sender that has been selected and/or identified in a safe sender list. The routing description 208 provides a recipient of an email message with information to make a decision whether to change the factors on which the email routing decisions are based. The recipient of an email message may want to change the factors for email routing decisions so that the actual destination of an email message correlates to the email recipient's expected destination.

The routing description 208 includes a selectable link 210, which may be a selectable link to a user-created rule, an email filter, or an email list. An email recipient can then initiate an email routing input to select the selectable link 210 and modify the routing decision or decisions that are the basis to route the email message to the particular email folder. The routing description 208 is not only informative, but is also actionable on the information that is provided. For example, a user may click on the safe list (e.g., selectable link 210) to initiate a display of the safe sender list, from which the sender of the email message 202 can be removed or deleted. The routing decisions can be modified at the client device 102 and/or at the email distribution service 106. In an embodiment, the email routing service 120 at the email distribution service 106 can receive an email routing input as feedback from the client device to modify the email routing decisions at the email distribution service.

Figure 3:
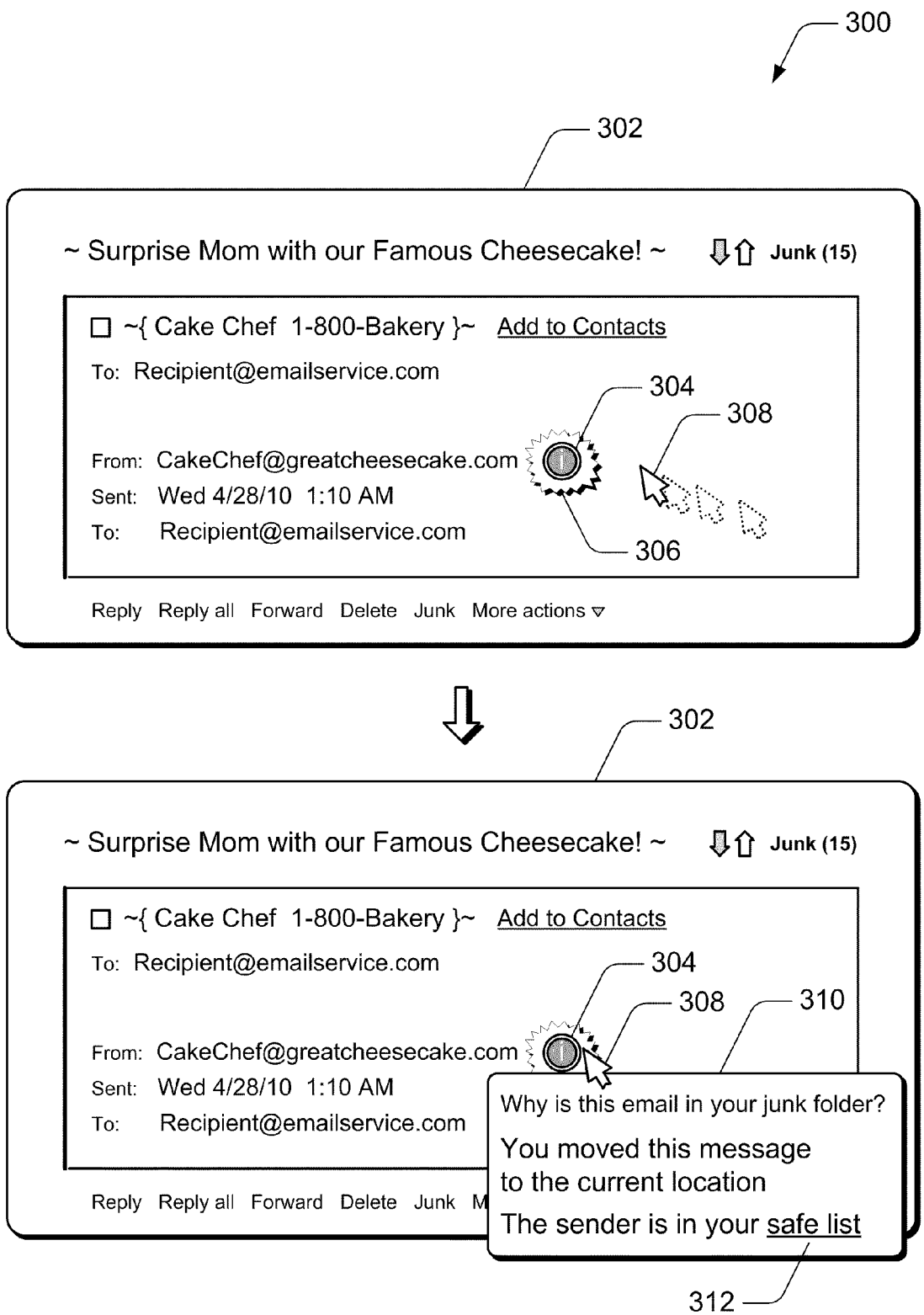
FIG. 3 illustrates another example of a tagged email message in accordance with one or more embodiments.

FIG. 3 illustrates another example 300 of a tagged email message 302 in accordance with the various embodiments described herein. The tagged email message 302 is an example of the tagged email message 146 received at client device 102 as described with reference to FIG. 1. In this example 300, the tagged email message 302 includes a selectable information control 304 that correlates to the email tag of the email message. The selectable information control 304 also includes a visual indication 306 of the email tag to warn a recipient that the email message may have been incorrectly routed to the particular email folder. In this instance, the tagged email message 302 has been routed to the junk email folder, such as when an email message is determined to be a spam or phishing message.

An email message warning (e.g., the visual indication 306) can be displayed as any type of text, image, animation, color, or other indication intended to notify or catch the attention of the email recipient. An email message warning may be displayed to notify the email recipient that a particular email message is urgent, or may have been misrouted. For example, users typically ignore email messages that are delivered to a junk email folder as likely spam or phishing emails that have been detected and routed accordingly. However, if an email from a sender that is also in an email recipient's contact list is routed to the junk email folder, an email message warning may be displayed to catch the attention of the email recipient who may want to review the email message.

As described above, a user can provide an input to initiate the selectable information control 304 and display the email tag, such as by moving a displayed pointer 308 proximate the selectable information control 304, which initiates a display of the routing description 310. In this example, the routing description 310 indicates why the tagged email message 302 was routed to a particular email folder, such as the junk email folder. In this instance, the tagged email message 302 is from a sender that has been selected and/or identified in a safe sender list. However, during some previous interaction with the email message, the user moved the email message to the junk folder. The routing description 310 serves as a reminder to the email recipient that the email message was moved, rather than a routing decision error causing the otherwise safe sender email to be routed to the junk folder.

FIG. 4 illustrates example email tags 400 in accordance with the various embodiments described herein. The email tags 400 are an example of the email tags 118 described with reference to FIG. 1. In this example, each of the email tags 400 are identified by a code 402 that is associated with routing logic 404, and each email tag includes a corresponding routing description 406. For example, the coded #2 email tag is associated with a safe list of email senders (e.g., routing logic 404) and indicates when a sender is in an email recipient's safe list (e.g., routing description 406), such as shown in the routing description 208 as described with reference to FIG. 2. In another example, the email tags coded #9-#13 all have the same corresponding routing description 406 for the various, different routing logic 404 that is associated with each of the email tags. It should also be noted that the list of email tags 400 is merely exemplary and not limited to only the email tags shown and described. Any number of email tags, based on various routing logic, may be implemented to display corresponding routing descriptions.

Figure 5:
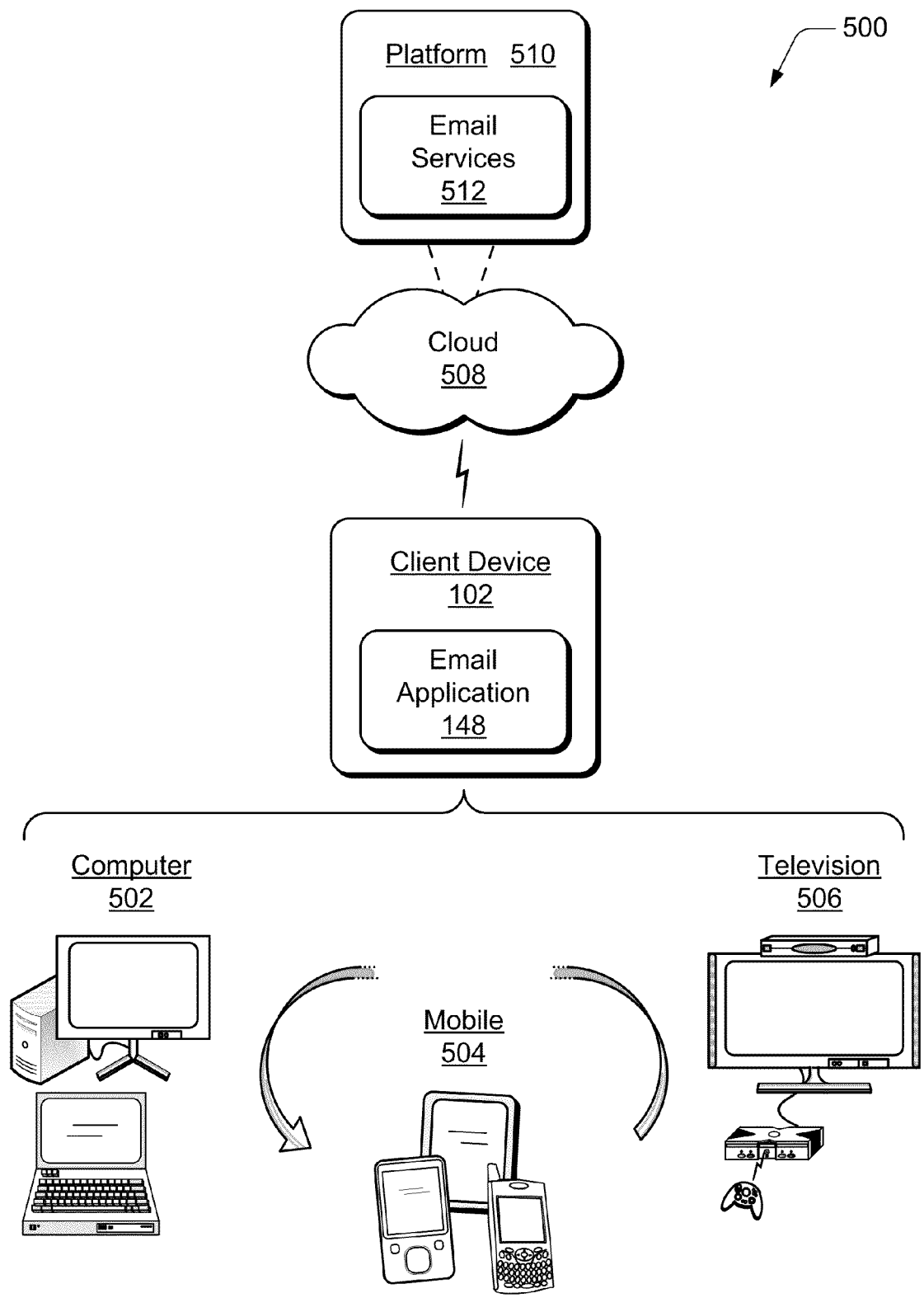
FIG. 5 illustrates an example system with multiple devices that can implement various embodiments of email tags for a seamless user experience in ubiquitous environments.

FIG. 5 illustrates an example system 500 that includes the client device 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 502, mobile 504, and television 506 uses. Each of these configurations includes devices that may have generally different constructs and capabilities, and thus the client device 102 may be configured according to one or more of the different device classes. For instance, the client device 102 may be implemented as the computer 502 class of a device that includes a personal computer, desktop computer, a multi-screen computer, laptop computer, netbook, and so on.

The client device 102 may also be implemented as the mobile 504 class of device that includes mobile devices, such as a mobile phone, portable music player, portable gaming device, a tablet computer, a multi-screen computer, and so on. The client device 102 may also be implemented as the television 506 class of device that includes devices having or connected to generally larger screens in casual viewing environments. These devices include televisions, set-top boxes, gaming consoles, and so on. The techniques described herein may be supported by these various configurations of the client device 102 and are not limited to the specific examples of email tags described herein.

The cloud 508 includes and/or is representative of a platform 510 for media content services 512. The platform 510 abstracts underlying functionality of hardware (e.g., servers) and software resources of the cloud 508. The media content services 512 may include applications and/or data that can be utilized while computer processing is executed on servers that are remote from the client device 102. For example, the email services 512 may include the email distribution service 106 and/or the email routing service 120 as described with reference to FIG. 1. The email services 512 can be provided as a service over the Internet and/or through a subscriber network, such as a cellular or WiFi network.

The platform 510 may abstract resources and functions to connect the client device 102 with other computing devices. The platform 510 may also serve to abstract scaling of resources to provide a corresponding level of scale to encountered demand for the email services 512 that are implemented via the platform 510. Accordingly, in an interconnected device embodiment, implementation of functionality of the email application 144 may be distributed throughout the system 500. For example, the email application 144 may be implemented in part on the client device 102 as well as via the platform 510 that abstracts the functionality of the cloud 508.

Example methods 600 and 700 are described with reference to respective FIGS. 6 and 7 in accordance with one or more embodiments of email tags. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 6:
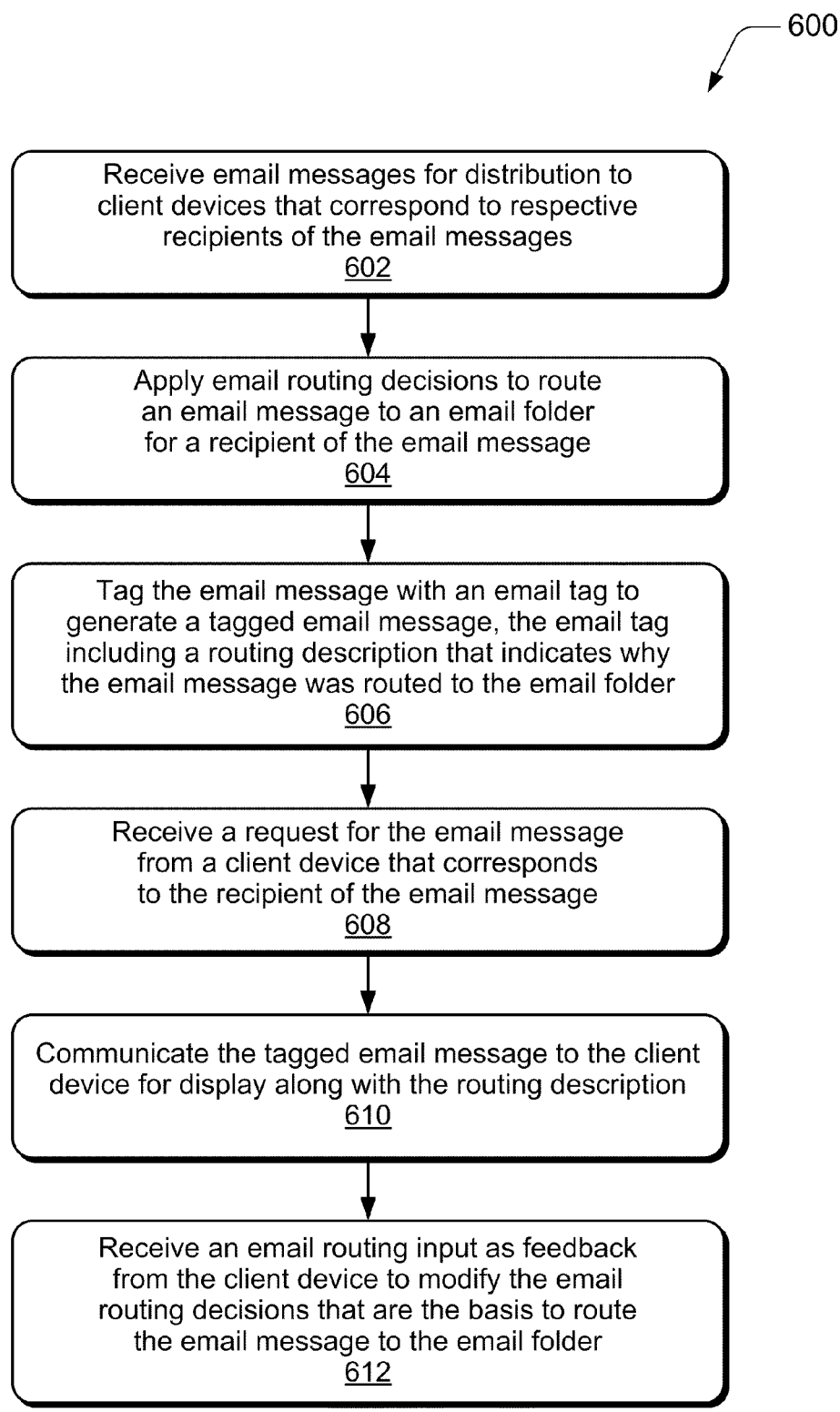
FIG. 6 illustrates example method(s) of email tags in accordance with one or more embodiments.

FIG. 6 illustrates example method(s) 600 of email tags, and is described with reference to an email distribution service. The order in which the method blocks are described are not intended to be construed as a limitation, and any number of the described method blocks can be combined in any order to implement a method, or an alternate method.

At block 602, email messages are received for distribution to client devices that correspond to respective recipients of the email messages. For example, the email distribution service 106 receives email messages 108 for distribution to the various client devices 104 that correspond to respective recipients of the email messages.

At block 604, email routing decisions are applied to route an email message to an email folder for a recipient of the email message. For example, the email routing service 120 applies email routing decisions to route an email message 108 to an email folder for a recipient of the email message, such as a user that is associated with the client device 102. The email routing decisions can include the user-created rules 122, the email filters 124, and/or the email lists 126 (e.g., safe sender list, contact list, safe domain list, safe mailing list, and the like). An email folder for a recipient may include any one of an email inbox, junk folder, user-created folder (e.g., a custom folder), and the like.

At block 606, the email message is tagged with an email tag to generate a tagged email message, the email tag including a routing description that indicates why the email message was routed to the email folder. For example, the email routing service 120 tags an email message 108 that has been routed to a particular email folder with an email tag 118 to generate a tagged email message 128. An email tag 118 can include a routing description that indicates why an email message was routed to a particular email folder for a recipient of the email message. The routing description correlates to a logical routing determinant and can include a selectable link to an email filter, an email list, or a user-created rule. An email tag 118 may also include a visual indication to warn an email recipient that the email message may have been incorrectly routed to the particular email folder.

At block 608, a request is received for the email message from a client device that corresponds to the recipient of the email message, and at block 610, the tagged email message is communicated to the client device for display along with the routing description. For example, the email distribution service 106 receives a request for an email message 108 from the client device 102 that corresponds to the recipient of the email message, and then communicates the corresponding tagged email message 128 to the client device for display along with the routing description.

At block 612, an email routing input is received as feedback from the client device to modify the email routing decisions that are the basis to route the email message to the email folder. For example, the email routing service 120 at the email distribution service 106 receives an email routing input as feedback from the client device 102 to modify the email routing decisions at the email distribution service.

Figure 7:
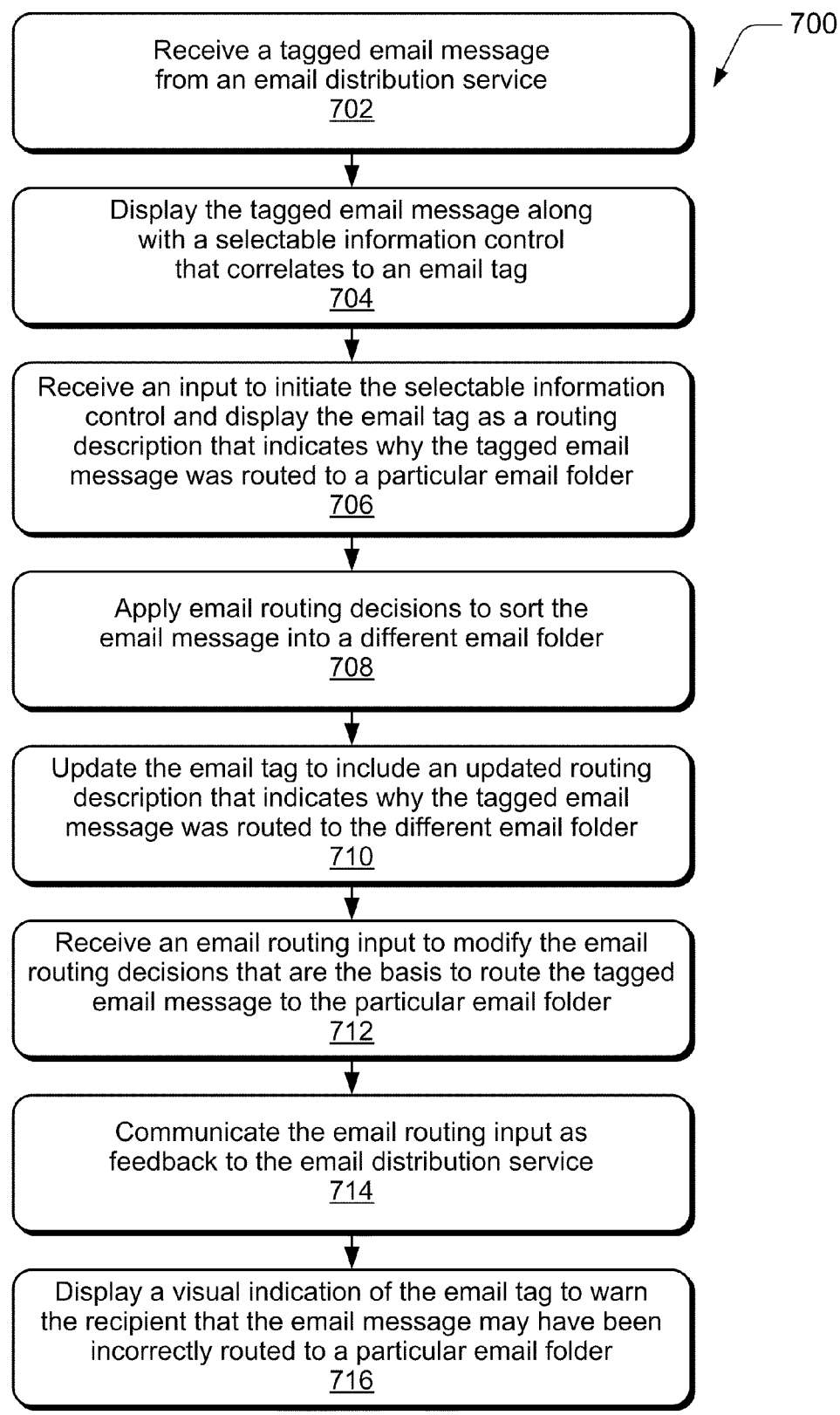
FIG. 7 illustrates additional example method(s) of email tags in accordance with one or more embodiments.

FIG. 7 illustrates example method(s) 700 of email tags, and is described with reference to a client device. The order in which the method blocks are described are not intended to be construed as a limitation, and any number of the described method blocks can be combined in any order to implement a method, or an alternate method.

At block 702, a tagged email message is received from an email distribution service. For example, the client device 102 receives a tagged email message 146 from the email distribution service 106, such as when a user at the client device initiates the email application 144 to request, receive, and process email messages. At block 704, the tagged email message is displayed along with a selectable information control that correlates to an email tag. For example, the client device 102 displays the tagged email message (e.g., on display device 142 or on an integrated display) along with a selectable information control that correlates to the email tag of the email message.

At block 706, an input is received to initiate the selectable information control and display the email tag as a routing description that indicates why the tagged email message was routed to a particular email folder. For example, a user can provide an input that is received at the client device 102 to initiate the selectable information control 204 and display the email tag, such as by moving the displayed pointer 206 that correlates to an input device (e.g., a computer mouse, or similar pointing and/or selecting input device). The client device 102 detects the displayed pointer 206 when the pointer is displayed proximate the selectable information control 204, which initiates a display of the routing description 208. Additionally, the routing description 208 includes the selectable link 210, which may be a selectable link to a user-created rule, an email filter, or an email list.

At block 708, email routing decisions are applied to sort the email message into a different email folder. For example, the email application 144 at the client device 102 may also apply additional email routing decisions to sort a tagged email message into a different email folder after the tagged email message is received from the email distribution service.

At block 710, the email tag is updated to include an updated routing description that indicates why the tagged email message was routed to the different email folder. For example, the email application 144 updates the email tag to include an updated routing description that indicates why the tagged email message was routed to the different email folder. At block 712, an email routing input is received to modify the email routing decisions that are the basis to route the tagged email message to the particular email folder. For example, an email recipient at the client device 102 can initiate an email routing input to select the selectable link 210 and modify the routing decision or decisions that are the basis to route the email message to the particular email folder.

At block 714, the email routing input is communicated as feedback to the email distribution service. For example, the client device 102 communicates the email routing input to the email distribution service 106 where the email routing service 120 can modify the email routing decisions at the email distribution service. At block 716, a visual indication of the email tag is displayed to warn the recipient that the email message may have been incorrectly routed to a particular email folder. For example, the tagged email message 302 includes a selectable information control 304 that correlates to the email tag of the email message. The selectable information control 304 also includes a visual indication 306 of the email tag that is displayed to warn a recipient that the email message may have been incorrectly routed to a particular email folder.

Figure 8:
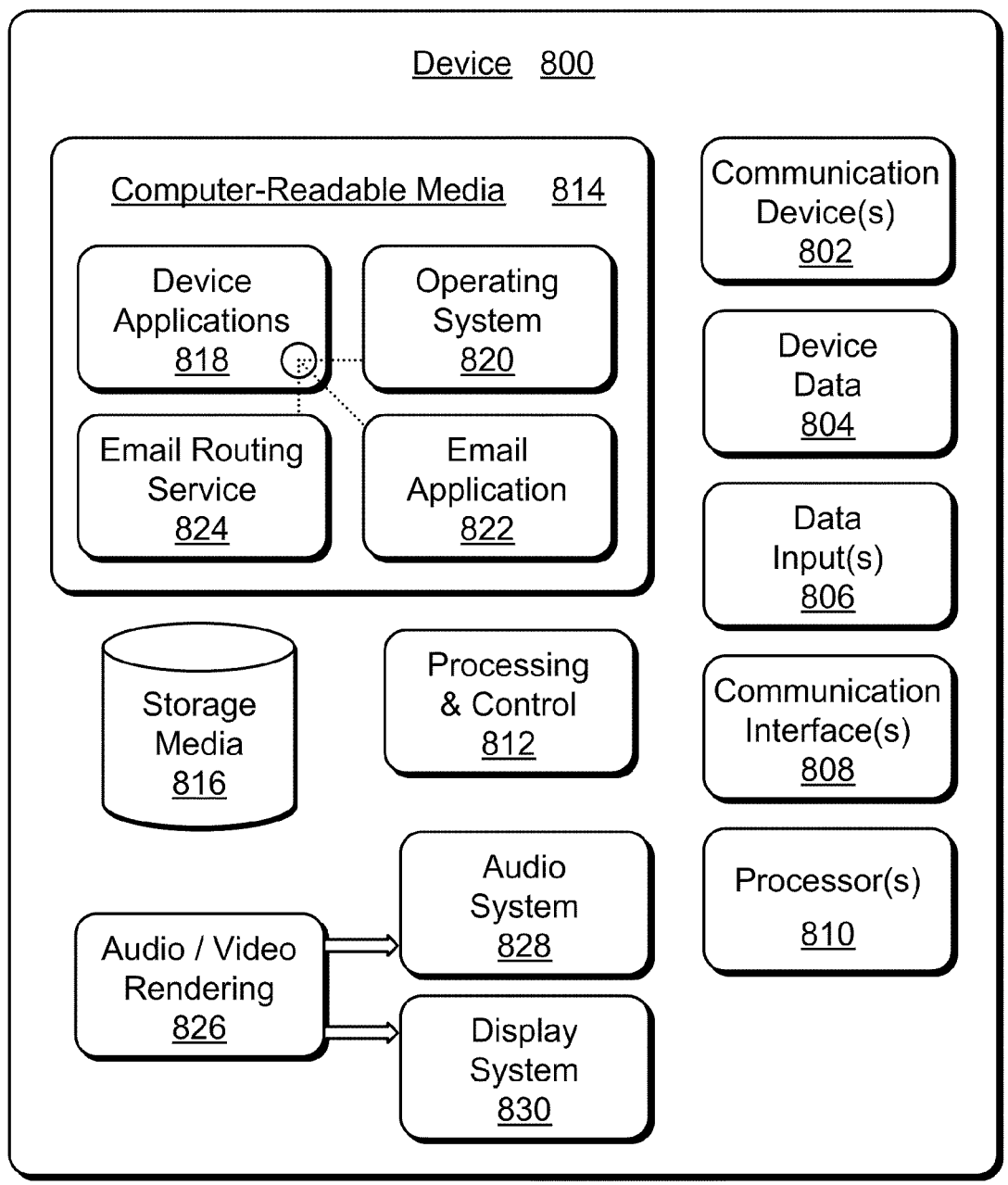
FIG. 8 illustrates various components of an example device that can implement embodiments of email tags.

FIG. 8 illustrates various components of an example device 800 that can be implemented as any type of client, portable, and/or computing device as described with reference to the previous FIGS. 1-7 to implement embodiments of email tags. In embodiments, device 800 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 800 may also be associated with a user (i.e., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on the device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of email tags. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal processing and control module, code that is native to a particular device, a hardware abstraction layer for a particular device, and so on.

The device applications 818 also include any system components or modules to implement embodiments of email tags. In this example, the device applications 818 can include an email application 822, such as when device 800 is implemented as a client device. Alternatively or in addition, the device applications 818 can include an email routing service 824, such as when device 800 is implemented as an email distribution service. The email application 822 and the email routing service 824 are shown as software modules and/or computer applications. Alternatively or in addition, the email application 822 and/or the email routing service 824 can be implemented as hardware, software, firmware, or any combination thereof.

Device 800 also includes an audio and/or video rendering system 826 that generates and provides audio data to an audio system 828 and/or generates and provides display data to a display system 830. The audio system 828 and/or the display system 830 can include any devices that process, display, and/or otherwise render audio, display, and image data. Display data and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Although embodiments of email tags have been described in language specific to features and/or methods, it is to be understood that the subject of the appended claims is not necessarily limited to the specific features or methods described. Rather, the specific features and methods are disclosed as example implementations of email tags.

The invention claimed is:

1. A computer-implemented method, comprising:
receiving email messages for distribution to client devices that correspond to respective recipients of the email messages;
applying one or more email routing decisions to route an email message to an email folder for a recipient of the email message, the email folder including at least one of an email inbox or user-created folder; and
tagging the email message with an email tag to generate a tagged email message, the email tag including a routing description that includes a textual description of why the email message was routed to the email folder, the email message configured to be displayed along with a selectable information control at a client device that corresponds to the recipient of the email message, wherein the selectable information control is configured to cause the textual description of why the email message was routed to the email folder to be displayed at the client device responsive to selection of the selectable information control at the client device.

2. A computer-implemented method as recited in claim 1, further comprising:
receiving a request for the email message from the client device that corresponds to the recipient of the email message; and
communicating the tagged email message to the client device for display along with the routing description.

3. A computer-implemented method as recited in claim 2, further comprising receiving an email routing input as feedback from the client device to modify the one or more email routing decisions that are the basis to route the email message to the email folder.

4. A computer-implemented method as recited in claim 1, wherein the email tag further includes a visual indication to warn the recipient that the email message may have been incorrectly routed to the email folder.

5. A computer-implemented method as recited in claim 1, wherein the routing description includes a selectable link to at least one of an email filter, an email list, or a user-created rule.

6. A computer-implemented method as recited in claim 1, wherein the routing description correlates to a logical routing determinant.

7. A system, comprising:
an email distribution service configured to receive email messages for distribution to client devices that correspond to respective recipients of the email messages;
at least a memory and a processor, the memory comprising instructions stored thereon that, responsive to execution by the processor, implement an email routing service configured to:
apply one or more email routing decisions to route an email message to an email folder for a recipient of the email message, the email folder including at least one of an email inbox or user-created folder; and
tag the email message with an email tag to generate a tagged email message, the email tag including a routing description that includes a textual description of why the email message was routed to the email folder, the email message configured to be displayed along with a selectable information control at a client device that corresponds to the recipient of the email message, wherein the selectable information control is configured to cause the textual description of why the email message was routed to the email folder to be displayed at the client device responsive to selection of the selectable information control at the client device.

8. A system as recited in claim 7, wherein the email distribution service is further configured to:
receive a request for the email message from the client device that corresponds to the recipient of the email message; and
communicate the tagged email message to the client device for display along with the routing description.

9. A system as recited in claim 8, wherein the email routing service is further configured to receive an email routing input as feedback from the client device to modify the one or more email routing decisions that are the basis to route the email message to the email folder.

10. A system as recited in claim 7, wherein the routing description includes a selectable link to at least one of an email filter, an email list, or a user-created rule.

11. A system as recited in claim 7, further comprising a client device configured to:
receive the tagged email message from the email distribution service;
display the tagged email message along with a selectable information control that correlates to the email tag; and
receive an input to initiate the selectable information control and display the email tag as the routing description that indicates why the tagged email message was routed to the email folder.

12. A system as recited in claim 11, wherein the client device includes an email application configured to:
apply one or more additional email routing decisions to sort the tagged email message into a different email folder after the tagged email message is received from the email distribution service; and
update the email tag to include an updated routing description that indicates why the tagged email message was routed to the different email folder.

13. A system as recited in claim 11, wherein the client device is further configured to display a visual indication of the email tag to warn the recipient that the email message may have been incorrectly routed to the email folder.

14. One or more computer-readable storage devices comprising instructions stored thereon that, responsive to execution by a processor, perform operations comprising:
receiving email messages for distribution to client devices that correspond to respective recipients of the email messages;
applying one or more email routing decisions to route an email message to an email folder for a recipient of the email message, the email folder including at least one of an email inbox or user-created folder; and
tagging the email message with an email tag to generate a tagged email message, the email tag including a routing description that includes a textual description of why the email message was routed to the email folder, the email message configured to be displayed along with a selectable information control at a client device that corresponds to the recipient of the email message, wherein the selectable information control is configured to cause the textual description of why the email message was routed to the email folder to be displayed at the client device responsive to selection of the selectable information control at the client device.

15. One or more computer-readable storage devices as recited in claim 14, wherein the instructions, responsive to execution by the processor, perform operations further comprising:
receiving a request for the email message from the client device that corresponds to the recipient of the email message; and
communicating the tagged email message to the client device for display along with the routing description.

16. One or more computer-readable storage devices as recited in claim 15, wherein the instructions, responsive to execution by the processor, perform operations further comprising receiving an email routing input as feedback from the client device to modify the one or more email routing decisions that are the basis to route the email message to the email folder.

17. One or more computer-readable storage devices as recited in claim 14, wherein the email tag further includes a visual indication to warn the recipient that the email message may have been incorrectly routed to the email folder.

18. One or more computer-readable storage devices as recited in claim 14, wherein the routing description includes a selectable link to at least one of an email filter, an email list, or a user-created rule.

19. One or more computer-readable storage devices as recited in claim 14, wherein the routing description correlates to a logical routing determinant.

* * * * *